Sept. 8, 1925.

H. AUTHENRIETH

CHIP BOX

Filed July 13, 1923     2 Sheets-Sheet 1

1,552,665

Inventor.
Herschel Authenrieth
By Charles J. Cope Atty.

Sept. 8, 1925.
H. AUTHENRIETH
CHIP BOX
Filed July 13, 1923   2 Sheets-Sheet 2
1,552,665
Fig. 2.
Fig. 3.
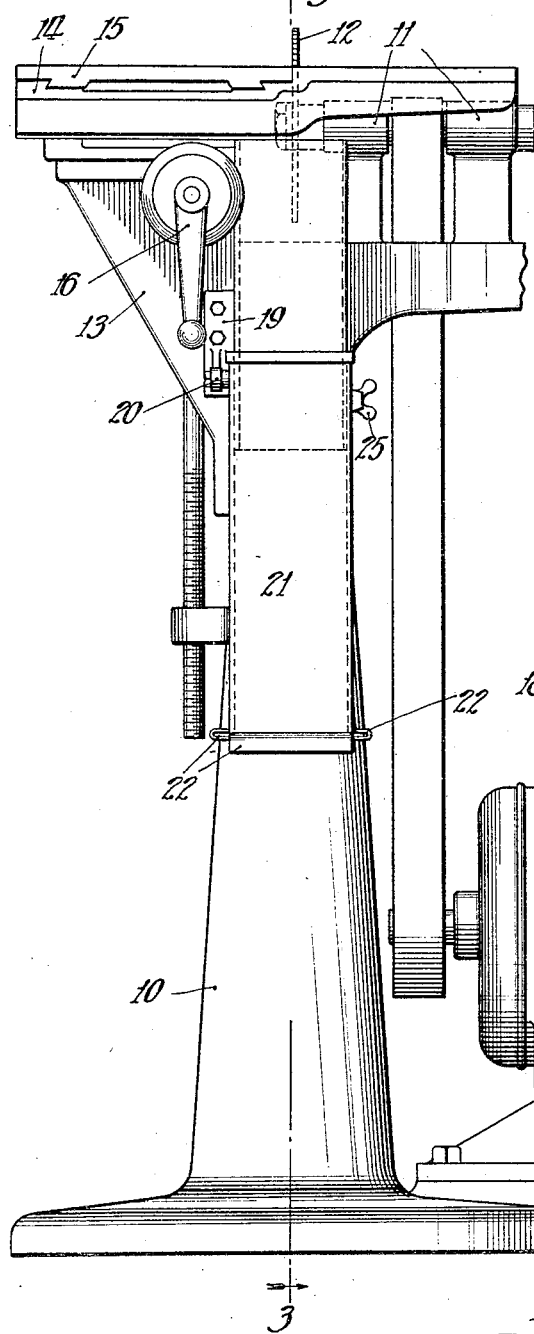
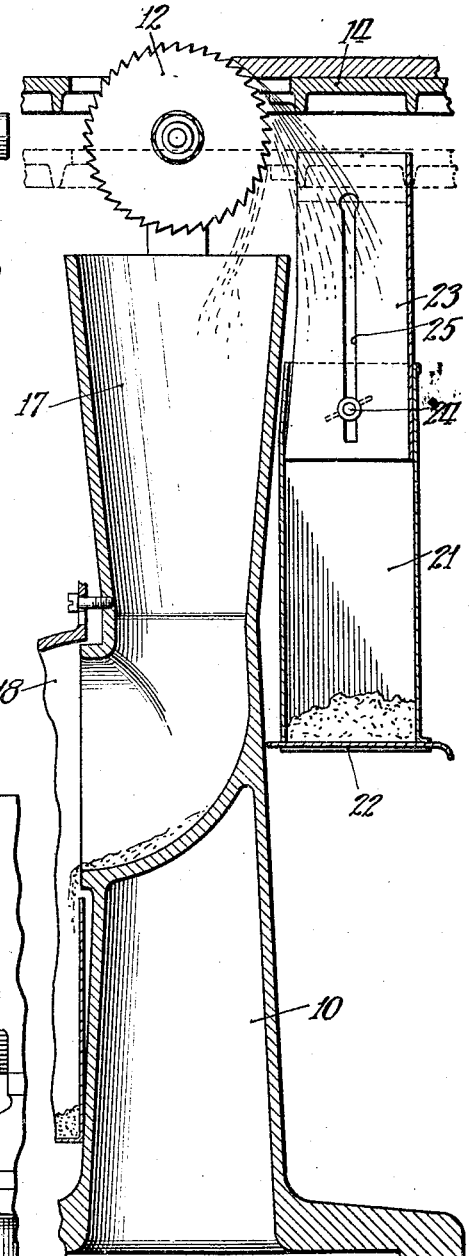
Inventor.
Herschel Authenrieth.
By Charles G. Cope
Atty.

Patented Sept. 8, 1925.

1,552,665

UNITED STATES PATENT OFFICE.

HERSCHEL AUTHENRIETH, OF MATTOON, ILLINOIS.

CHIP BOX.

Application filed July 13, 1923. Serial No. 651,276.

*To all whom it may concern:*

Be it known that I, HERSCHEL AUTHENRIETH, a citizen of the United States, residing at Mattoon, in the county of Coles and State of Illinois, have invented new and useful Improvements in Chip Boxes, of which the following is a specification.

My invention pertains to chip boxes, and relates especially to chip boxes for use in connection with circular saws having work supporting tables which are vertically movable with respect to the saw.

It is an object of my invention to provide a chip box which will effectively collect the chips, dust and the like thrown off by the saw, regardless of the position of the saw with respect to the work table. It is another object of my invention to provide a chip box which will be of a simple and economical construction, easy to attach and remove, convenient in use, and capable of adjustment to enable part of the space it normally occupies to be otherwise utilized if desired.

A chip box constructed in accordance with my invention is described in the following specification and shown, in connection with a sawing machine, in the accompanying drawings, in which:

Fig. 2 is a front elevation of the same; and

Fig. 3 is a sectional side elevation, the section being taken on the line 3—3 of Fig. 2, looking in the direction of the arrows.

Figure 1:
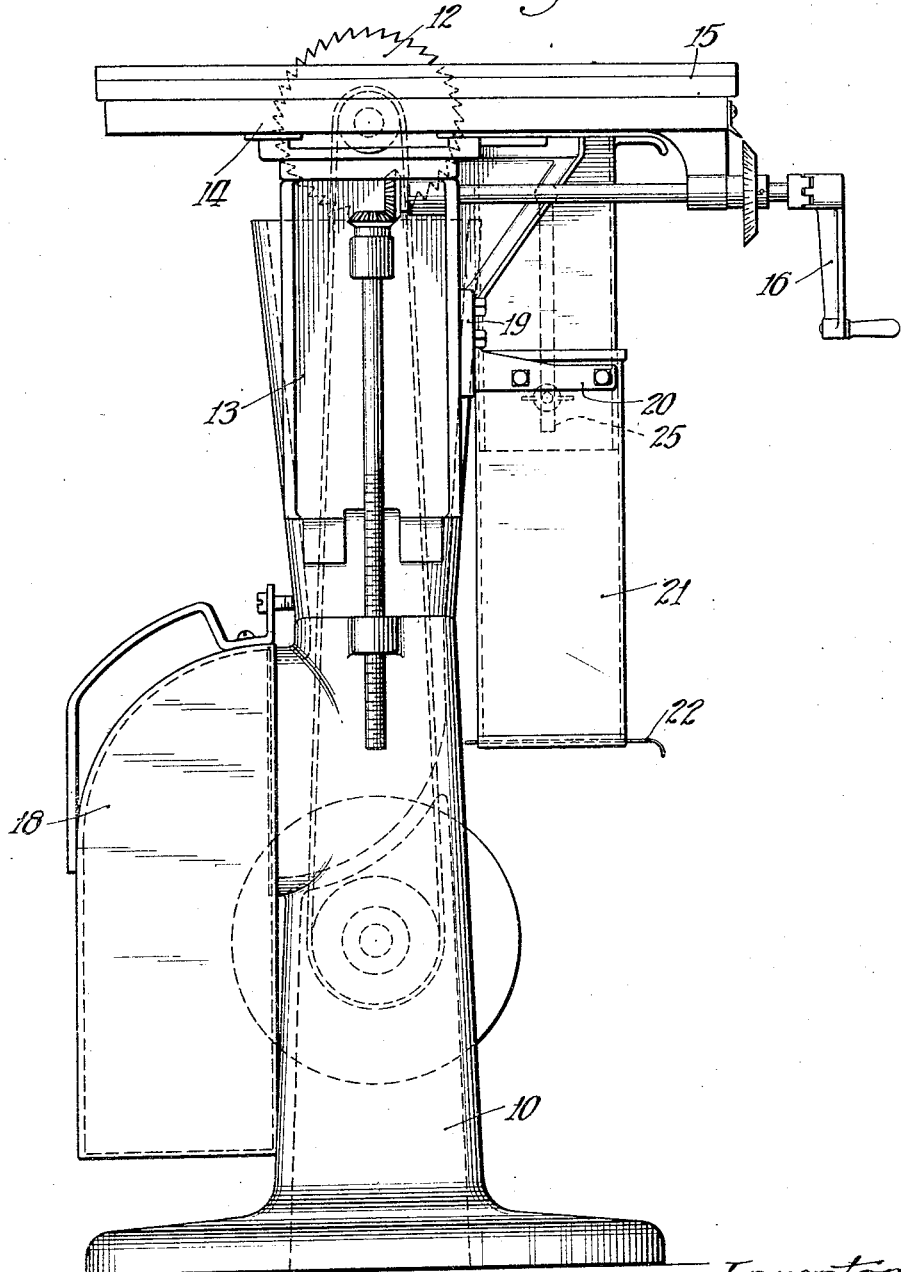
Fig. 1 is a side elevation of a sawing machine having a chip box constructed in accordance with my invention applied hereto.

The sawing machine herein described and illustrated is of the type disclosed in Letters Patent No. 1,030,598 granted June 25, 1912, on the application of Harry G. Miller, and includes a base or pedestal 10, carrying bearings 11 in which is supported the arbor of a circular saw 12. Mounted on the pedestal 10, so as to be vertically slidable thereon, is a bracket 13, which carries a bed 14 on which is slidably mounted a work-table 15. The work to be sawed is suitably secured in position upon the sliding work-table 15, whereupon the table is pushed past the saw 12, and the cutting off operation thereby effected. By means of a handle 16 and associated gearing, this support 14, and consequently the work table 15, may be moved vertically with respect to the saw. For normal work, the saw table occupies a position such as that shown in dotted lines in Fig. 3. When it is desired to under-cut, or when the saw arbor would be in the path of the waste side of the work being sawed, the table may be raised, by means of the handle 16, into a position such as that shown in full lines in Fig. 3. In a machine of this general character, it has been common to make the upper part of the pedestal 10 hollow, so as to form a chute 17 into when can fall a large proportion of the chips thrown off by the saw during its operation. Such chute 17 has been made with a sidewise opening mouth, over which is placed a removable waste receptacle 18. The parts, as thus far described, are old and well known in the art.

The above described chute 17 is sufficiently serviceable when the saw table is in its normal position indicated by dotted lines in Fig. 3; since, with the parts in that position, the chips, dust and the like, are thrown chiefly in a substantially vertical downward direction. When, however, the table is raised into such a position as is indicated in full lines in Fig. 3, the chute 17 is not entirely effective, for the reason that the chips and dust are thrown off more obliquely and find their way out onto the floor through the space between the top of the chute 17 and the bottom of the table. Difficulty has been experienced in avoiding this drawback, whilst, at the same time, permitting of the use of attachments on the under side of the saw table—such attachments, for instance, as the jig saw and router described in the said Miller Patent No. 1,030,598.

According to my invention, I provide a bracket 19 which is secured by suitable bolts to the vertically adjustable table-bracket 13. The bracket 19 is formed with a forwardly projecting arm 20 to which is secured a vertically disposed lower box-member 21 of a rectangular shape in cross-section. The lower end of the lower box-member 21 is closed by means of a removable slide 22. Telescoping into the lower box-member 21 is an upper box-member 23, the rear side of which, being the side adjacent the saw 12, is open. The upper box-member 23 is adjustably secured in position by means of a pin 24 which passes through an elongated slot 25 therein and enters the lower box-member 21. The pin 24 is provided with a thumb nut 25 for locking the upper box-member in its adjusted position.

Normally, the upper box-member is adjusted so that its top face is close to the lower face of the work table, in which position it follows the work table up and down during the vertical adjustment of the latter. Any chips or dust thrown off laterally, which occurs most often when the work table is in its elevated position, will be caught by the upper box-member 23 and deflected downward into the lower box-member 21. This dust and waste material can be removed from time to time by withdrawing the slide 22. When it is desired to use any appliance which would occupy the space beneath the work table normally taken up by the upper box-member 23, as for instance, when a jig saw is to be used, the thumb screw 25 is loosened, and the upper box member 23 is moved downwardly into the lower box member 21, in which position it can remain during the use of such appliance.

Having thus fully described my invention, what I claim as new, and desire to secure by Letters Patent, is:

The combination with a rotary saw and a work support vertically adjustable with respect thereto, of a chip box secured to said support beneath the same and having a portion disposed adjacent the saw, said chip box including a lower box-member and an upper box-member vertically adjustable with respect thereto, said upper box-member having an opening facing the saw-edge, whereby said box will receive the chips in various positions of adjustment of said support with respect to said saw.

HERSCHEL AUTHENRIETH.